(12) United States Patent
Eom

(10) Patent No.: US 12,307,823 B2
(45) Date of Patent: May 20, 2025

(54) DISPLAY APPARATUS AND METHOD FOR CONTROLLING THEREOF

(71) Applicant: Samsung Electronics Co., Ltd., Suwon-si (KR)

(72) Inventor: Gimun Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 731 days.

(21) Appl. No.: 17/469,556

(22) Filed: Sep. 8, 2021

(65) Prior Publication Data

US 2022/0092300 A1 Mar. 24, 2022

(30) Foreign Application Priority Data

Sep. 22, 2020 (KR) .......................... 10-2020-0122526

(51) Int. Cl.
*G06V 40/20* (2022.01)
*A63B 24/00* (2006.01)
(Continued)

(52) U.S. Cl.
CPC .......... *G06V 40/23* (2022.01); *A63B 71/0622* (2013.01); *G06F 3/011* (2013.01);
(Continued)

(58) Field of Classification Search
CPC .. G06V 40/23; G06V 40/103; A63B 71/0622; A63B 2071/0638;
(Continued)

(56) References Cited

U.S. PATENT DOCUMENTS

| 2013/0171601 A1 | 7/2013 | Yuasa et al. |
| 2019/0180473 A1 | 6/2019 | Guleryuz |
| 2020/0197746 A1* | 6/2020 | Kang ................... A61B 5/7425 |

FOREIGN PATENT DOCUMENTS

| JP | 2015028702 A | * | 2/2015 |
| JP | 2020-009316 | | 1/2020 |

(Continued)

OTHER PUBLICATIONS

International Search Report and Written Opinion dated Dec. 23, 2021 in corresponding International Application No. PCT/KR2021/012286.

(Continued)

*Primary Examiner* — Jon Chang
(74) *Attorney, Agent, or Firm* — Nixon & Vanderhye P.C.

(57) ABSTRACT

A display apparatus is disclosed. The display apparatus includes: a camera, a display, a memory storing an artificial intelligence model trained to identify a posture of a user based on location data with respect to a plurality of body parts of a user included in images and additional location data acquired based on the location data, and a processor configured to: control the display to display a training image and images photographed by the camera, identify the posture of the user included in the photographed images by inputting the location data with respect to the plurality of body parts of the user included in the photographed images, and control the display to display a training guide based on whether the posture of the user matches a posture corresponding to the training image.

9 Claims, 13 Drawing Sheets

(51) Int. Cl.
*A63B 71/06* (2006.01)
*G06F 3/01* (2006.01)
*G06V 40/10* (2022.01)
*G09B 19/00* (2006.01)

(52) U.S. Cl.
CPC ........ *G06V 40/103* (2022.01); *A63B 24/0006* (2013.01); *A63B 2024/0015* (2013.01); *A63B 2071/0638* (2013.01); *A63B 2071/065* (2013.01); *A63B 2071/0694* (2013.01); *A63B 2208/0223* (2013.01); *A63B 2220/05* (2013.01); *A63B 2220/13* (2013.01); *A63B 2220/806* (2013.01); *G09B 19/0038* (2013.01)

(58) Field of Classification Search
CPC ...... A63B 2071/065; A63B 2208/0223; A63B 2220/05; A63B 2220/13; A63B 2220/806; A63B 24/0006; A63B 2024/0015; A63B 2071/0694; G06F 3/011; G09B 5/02; G09B 19/0038; G06N 20/00
See application file for complete search history.

(56) References Cited

FOREIGN PATENT DOCUMENTS

| | | |
|---|---|---|
| KR | 10-2018-0005050 | 1/2018 |
| KR | 10-1874188 | 8/2018 |
| KR | 10-1959079 | 3/2019 |
| KR | 10-1962045 | 3/2019 |
| KR | 10-2000763 | 7/2019 |
| KR | 10-2020-0011425 | 2/2020 |
| KR | 10-2097190 | 3/2020 |
| KR | 10-2020-0056233 | 5/2020 |
| KR | 10-2120828 | 6/2020 |
| KR | 10-2329781 | 11/2021 |
| KR | 10-2022-0037107 | 3/2022 |
| KR | 10-2377561 | 3/2022 |

OTHER PUBLICATIONS

Korean Office Action dated Apr. 9, 2025 for KR Application No. 10-2020-0122526.

* cited by examiner

DISPLAY APPARATUS AND METHOD FOR CONTROLLING THEREOF

CROSS-REFERENCE TO RELATED APPLICATION

This application is based on and claims priority under 35 U.S.C. § 119 to Korean Patent Application No. 10-2020-0122526, filed on Sep. 22, 2020, in the Korean Intellectual Property Office, the disclosure of which is incorporated by reference herein in its entirety.

BACKGROUND

1. Field

The disclosure relates to a display apparatus and a method for controlling thereof. For example, the disclosure relates to a display apparatus configured to provide a training image, and a method for controlling thereof.

2. Description of Related Art

In recent years, the number of people who do exercises in a fitness center for their health management, such as fitness training, yoga, Pilates, or the like is gradually increasing.

In addition, people who are unable to visit the fitness center due to time restrictions or want to exercise in a non-face-to-face manner are exercising through home training as an alternative manner.

Since home training is a way of exercising alone without a trainer, it is important for exercise effectiveness to accurately check whether people are exercising in correct postures and to be provided with a training guide for the exercise.

SUMMARY

Embodiments of the disclosure provide a display apparatus configured to identify a user's posture using an artificial intelligence model, and display a training guide based on whether the user's posture matches a posture of a training image, and a method for controlling thereof.

According to an example embodiment of the disclosure, a display apparatus includes: a camera, a display, a memory storing an artificial intelligence module trained to identify a posture of a user based on location data with respect to a plurality of body parts of a user included in images, and additional location data acquired based on the location data, and a processor configured to: control the display to display a training image and images photographed by the camera, identify the user's posture included in the photographed images by inputting the location data with respect to the plurality of body parts of the user included in the photographed images, and control the display to display a training guide based on whether the user's posture matches a posture corresponding to the training image.

The additional location data may be acquired by rotating the location data.

The processor may be configured, based on the user's posture natching the posture corresponding to the training image, to control the display to display the training guide including information indicating that the user's posture matches the posture corresponding to the training image, and based on the user's posture not matching the posture corresponding to the training image, to display the training guide including information indicating that the user's posture does not match the posture corresponding to the training image.

The artificial intelligence model may be configured, based on location data with respect to a plurality of body parts of the user in a first posture included in the images, and additional location data acquired based on the location data, to be trained to identify the first posture of the user, and wherein the first posture is configured to match the posture corresponding to the training image.

The artificial intelligence model may be configured to be trained to identify a body part that has an exercise effect based on the first posture, and wherein the processor is configured, based on the user's posture being identified to match the posture corresponding to the training image, to control the display to display information on the body part that has the exercise effect based on information on a body part output from the artificial intelligence model.

The artificial intelligence model may be configured to be trained to identify a second posture of the user based on location data with respect to a plurality of body parts of the user in a second posture included in the images, and additional location data acquired based on the location data, and wherein the second posture does not match the posture corresponding to the training image.

The artificial intelligence model may be configured to be trained to identify a body part that has a negative exercise effect based on the second posture, and wherein the processor is configured, based on the user's posture not matching the posture corresponding to the training image, to control the display to display information on a body part that has the negative exercise effect based on information on a body part output from the artificial intelligence model.

According to an example embodiment of the disclosure, a method for controlling a display apparatus includes: displaying a training image and images photographed by a camera, identifying a user's posture included in the photographed images by inputting a location data with respect to a plurality of body parts of a user included in the photographed images, and displaying a training guide based on whether the user's posture matches a posture corresponding to the training image, wherein a artificial intelligence model is configured to be trained to identify the user's posture based on the location data with respect to the plurality of body parts of the user and additional location data acquired based on the location data.

The additional location data may be acquired by rotating the location data.

The displaying may include, based on the user's posture matching the posture corresponding to the training image, displaying the training guide including information indicating that the user's posture matches the posture corresponding to the training image, and based on the user's posture not matching the posture corresponding to the training image, displaying the training guide including information indicating that the user's posture does not match the posture corresponding to the training image.

The artificial intelligence model may be configured, based on location data with respect to a plurality of body parts of the user in a first posture included in the images, and additional location data acquired based on the location data, to be trained to identify the first posture of the user, and wherein the first posture matches the posture corresponding to the training image.

The artificial intelligence model may be configured to be trained to identify a body part that has an exercise effect based on the first posture, and wherein the displaying includes, based on the user's posture matching the posture corresponding to the training image, displaying information on the body part that has the exercise effect based on information on a body part output from the artificial intelligence model.

The artificial intelligence model may be configured to be trained to identify a second posture of the user based on location data with respect to a plurality of body parts of the user in a second posture included in the images, and additional location data acquired based on the location data, and wherein the second posture does not match the posture corresponding to the training image.

The artificial intelligence model may be configured to be trained to identify a body part that has a negative exercise effect based on the second posture, and wherein the displaying includes, based on the user's posture not matching the posture corresponding to the training image, displaying information on a body part that has the negative exercise effect based on information on a body part output from the artificial intelligence model.

According to various example embodiments of the disclosure, an artificial intelligence model for identifying the user's posture is trained based on location data and additional location data acquired by rotating the location data. Even if the user is photographed from various angles, it is possible to more accurately identify the user's posture included in the image.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
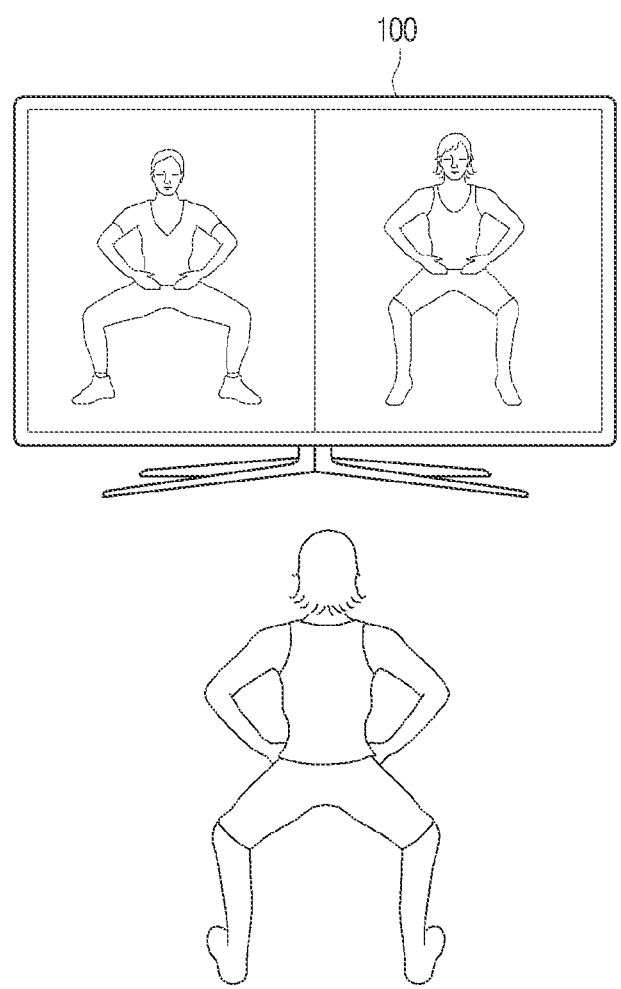
FIG. 1 is a diagram illustrating an example display apparatus according to various embodiments.

The above and other aspects, features, and advantages of certain example embodiments of the disclosure will be more apparent from the following description taken in conjunction with the accompanying drawings. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar elements.

In the disclosure, the terms "include", "may include", "comprise" or "may comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and to distinguish one element from another, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element (e.g., a third element) may not be provided between the other element.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

In the description, the term "configured to" may be used interchangeably with, for example, "suitable for", "having the capacity to", "designed to", "adapted to", "made to", or "capable of" under certain circumstances. The term "configured to (set to)" does not necessarily refer to "specifically designed to" in a hardware level. Under certain circumstances, the term "device configured to" may refer to "device capable of" doing something together with another device or components. For example, a phrase "a sub-processor configured to (set to) perform A, B, and C" may refer to a generic-purpose processor (e.g., CPU or application processor) capable of performing corresponding operations by executing a dedicated processor (e.g., embedded processor) for performing corresponding operation, or executing one or more software programs stored in a memory device.

FIG. 1 is a diagram illustrating an example display apparatus according to various embodiments.

The display apparatus 100 may perform a function for home training of a user.

In other words, the display apparatus 100 may display a training image, for example, a demonstration image of a trainer, on one area of the display, and also display an image photographed by a camera of the display apparatus 100 on another area of the display.

Accordingly, the user may check his or her posture (or exercise posture) while following the trainer's demonstration posture in the training image.

The display apparatus 100 may identify whether the user's posture matches the posture in the training image and provide a training guide for the user's posture.

The training guide may include information on whether the user's posture matches or does not match the trainer's posture.

For this operation, the display apparatus 100 may identify the user's posture using an artificial intelligence model. The artificial intelligence model may include a model trained to identify the user's posture from a corresponding image even if the user is photographed from various angles.

Accordingly, the display apparatus 100 according to an embodiment may more accurately identify the user's posture, which will be described in greater detail below.

Figure 2:
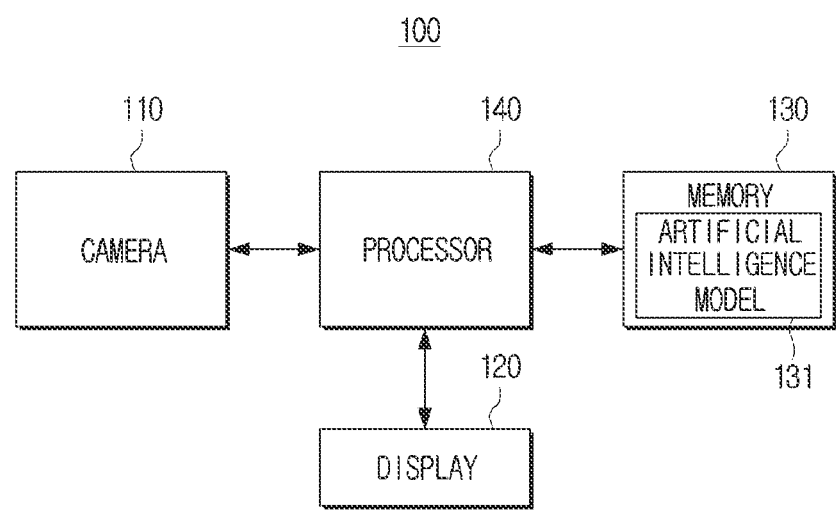
FIG. 2 is a block diagram illustrating an example configuration of a display apparatus according to various embodiments.

FIG. 2 is a block diagram illustrating an example configuration of a display apparatus according to various embodiments.

Referring to FIG. 2, the display apparatus 100 may include a camera 110, a display 120, a memory 130, and a processor (e.g., including processing circuitry) 140.

The camera 110 may photograph images. For example, the camera 110 may acquire an image by photographing a front side of the display apparatus 100.

For this operation, the camera 110 may include an image sensor for receiving external light, and an image photographed through the image sensor may be acquired.

The display 120 may display an image. In this case, the display 110 may be implemented as various types of displays such as, for example, and without limitation, LCD, LED, OLED, or the like.

The memory 130 may store various commands, programs or data necessary for the operation of the display apparatus 100.

The memory 130 may be implemented as a non-volatile memory, a volatile memory, a flash memory, a hard disk drive (HDD) or a solid state drive (SDD). The memory 130 may be accessed by the processor 140, and perform readout, recording, correction, deletion, update, and the like, on data by the processor 140.

For example, the memory 130 may include an artificial intelligence model (e.g., including executable program elements executed by the processor) 131 trained to identify the user's posture included in the image.

For this operation, the artificial intelligence model 131 may be implemented as a classifier for identifying the user's posture included in the image. In this case, the artificial intelligence model 131 may output a probability that the user's posture corresponds to a specific posture.

An example process in which the artificial intelligence model is trained will be described in greater detail below with reference to FIGS. 3 and 4.

The artificial intelligence model 131 may be a model trained to identify the user's posture based on location data for a plurality of body parts of the user included in images and additional location data acquired based on the location data.

The images are training images for training the artificial intelligence model 131, and the user included in the images may be a user different from the user who performs home training.

In addition, the location data for the plurality of body parts may include coordinate data for the plurality of body parts, and may include a plurality of key points indicating a plurality of joint parts of the user included in the image.

In order to obtain location data, an artificial intelligence model (not shown) for extracting a point of a human joint from the image may be used. However, this is only an example, and location data may be acquired in various ways.

In addition, the additional location data may be data acquired by rotating the location data.

For example, the plurality of key points acquired from the image may be two-dimensional coordinates. In this case, a plurality of three-dimensional coordinates may be acquired by converting the 2D coordinates to three-dimensional coordinates (3D) and applying random rotational transformation to the 3D coordinates, and additional location data may be acquired by converting the plurality of 3D coordinates to the 2D coordinates.

A method of acquiring additional location data according to an embodiment of the disclosure will be described in greater detail.

Depths for the plurality of key points acquired from the image may be estimated, and the plurality of key points may be transformed into 3D using this.

For example, an expected length for each body part may be calculated through a ratio of a size of each body part to a total size of the user included in the image.

For example, if the length of each body part is predefined according to the ratio of the size of each body part to the total size, the expected length of each body part may be calculated through the ratio of the size of each body part to the total size of the user included in the image.

The body part may be a body part defined by key points. For example, if the key points are wrist and elbow, the body part may be arm part between the wrist and the elbow defined by these key points.

A depth value for one of the plurality of key points, for example, a z value may be set to 0, and a depth value for a key point adjacent thereto may be calculated.

For example, if the z value is set to 0 for a key point $(x_1, y_1)$, 3D coordinates of the key point may be $(x_1, y_1, z_1)$ (here, $z_1=0$). In this case, when L is an estimated distance of the body part defined by the key point $(x_1, y_1)$ and the key point $(x_2, y_2)$ adjacent key point $(x_1, y_1)$, a depth value $z_2$ of the adjacent key point $(x_2, y_2)$ may be calculated based on Equation 1.

$$z_2 = z_1 + \sqrt{L^2 - (x_1-x_2)^2 - (y_1-y_2)^2}$$ [Equation 1]

Accordingly, the key points $(x_1, y_1)$ and $(x_2, y_2)$ may be converted into 3D coordinates such as $(x_1, y_1, z_1)$ and $(x_2, y_2, z_2)$, respectively. Through this method, the z value of the key point adjacent thereto may, for example, be sequentially calculated based on the key point from which the z value is calculated.

Accordingly, each of the plurality of key points may be transformed into 3D.

A plurality of rotated 3D key points may be acquired by applying a random rotation transformation to the plurality of 3D key points.

For example, random rotation transformation may be applied to each of the plurality of 3D key points based on Equation 2 below.

[Equation 2]

$$\begin{bmatrix} x' \\ y' \\ z' \end{bmatrix} = \begin{bmatrix} \cos(ay) & 0 & \sin(ay) \\ 0 & 1 & 0 \\ -\sin(ay) & 0 & \cos(ay) \end{bmatrix} \begin{bmatrix} 1 & 0 & 1 \\ 0 & \cos(ax) & -\sin(ax) \\ 0 & \sin(ax) & \cos(ax) \end{bmatrix}$$ [Equation 1]

$$\begin{bmatrix} \cos(az) & -\sin(az) & 1 \\ \sin(az) & \cos(az) & 0 \\ 1 & 0 & \cos(az) \end{bmatrix}\begin{bmatrix} x \\ y \\ z \end{bmatrix}$$

Here, zy, ax, az may represent randomly selected angle, (x, y, z) may represent a 3D key point, and (x', y', z') may represent a 3D key point to which random rotation transformation is applied, respectively.

Accordingly, a rotated 3D key point may be acquired with respect to each of the plurality of 3D key points.

Additional locational data may be acquired by converting the plurality of rotated 3D key points into 2D.

For example, a 2D key point such as (x', y') may be acquired by projecting each of the plurality of rotated 3D key points (x', y', z') in 2D.

Accordingly, a plurality of 2D key points in which the plurality of rotated 3D key points are converted into 2D may be acquired, and accordingly, additional location data including the plurality of 2D key points may be acquired.

Images may be images photographed by a user performing an exercise in a first posture or a second posture.

The artificial intelligence model 131 may be trained to identify the user's first posture based on the additional location data acquired based on the location data with respect to the user's plurality of body parts in the first posture included in the images and the additional location data acquired based on the location data.

The first posture may be a posture that matches a posture corresponding to the training image.

For example, the first posture may be the same posture as the trainer included in the training image, and may be a posture in which directions and angles of face, neck, torso, arms, legs, etc. are within a predetermined threshold range from a demonstration posture of the trainer.

In other words, the artificial intelligence model 131 may be trained to identify the user's posture matched with the training image using images photographed by a user exercising with an accurate posture.

Figure 3:
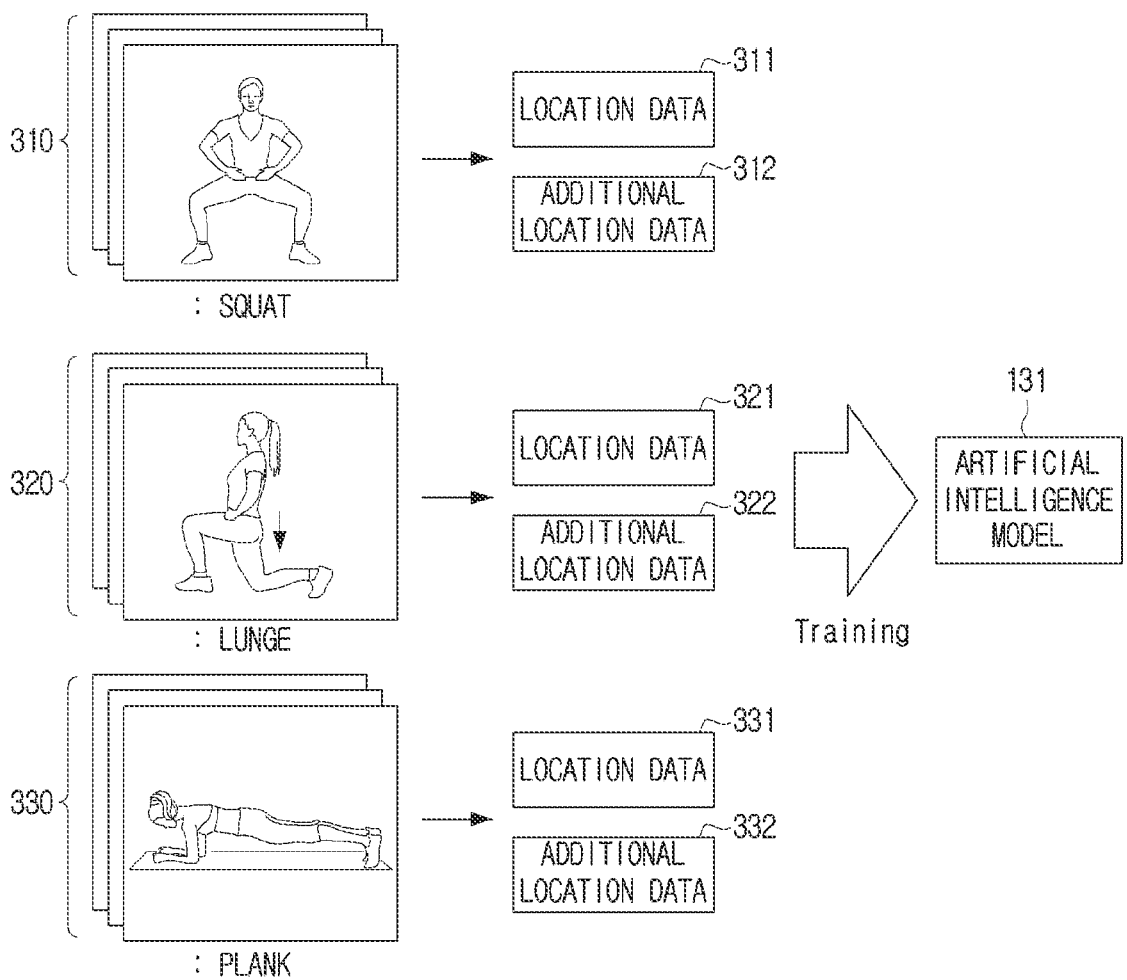
FIGS. 3 and 4 are diagrams illustrating an example process of training an artificial intelligence model according to various embodiments.

For example, referring to FIG. 3, location data 311 may be acquired from images 310 of the user performing "squat", and additional location data 312 may be acquired based on the location data.

In this case, the artificial intelligence model 131 may be trained using the location data 311 and the additional location data 312 as input data, and the "squat" posture as output data.

Similarly, the artificial intelligence model 131 may be trained using a location data 321 acquired from images 320 in which a user performing "lunge" is photographed, and additional location data 322 acquired based on the location data 321 as input data, and using the "lunge" posture as output data. In addition, the artificial intelligence model 131 may be trained using a location data 331 acquired from images 330 in which a user performing "plank" is photographed, and additional location data 332 acquired based on location data 331 as input data, and using the "plank" posture as output data As such, the artificial intelligence model 131 may be trained, for each of a plurality of postures, using location data acquired from images in which a user is photographed performing each posture, and additional location data acquired based on the location data.

Accordingly, the artificial intelligence model 131 may be trained to output the user's posture included in the image when location data for a plurality of body parts of the user acquired from an image in which the user is photographed.

According to an embodiment, the artificial intelligence model 131 may be trained to identify a body part where an exercise effect appears according to the first posture.

In other words, the artificial intelligence model 131 may be trained using not only location data and additional location data, but also information on body parts that are effective according to the user's posture as input data.

For example, a "squat" may be an effective exercise for legs, hips, and inner thighs.

In this case, the artificial intelligence model 131 may be trained using not only the location data and additional location data for the "squat", but also information about legs, hips, and thighs as input data, and the "squat" posture and the "legs, hips, and inner thighs" as output data.

Accordingly, when the location data for a plurality of body parts of the user acquired from the image of the user is input, the artificial intelligence model 131 may be trained to output information about the body parts that have an effect in the corresponding posture.

The artificial intelligence model 131 may be trained to identify the user's second posture based on the location data of the plurality of body parts of the user in the second posture included in the images and the additional location data acquired based on the location data.

The second posture may be a posture that does not match a posture corresponding to the training image.

For example, the second posture may be the same as the trainer's demonstration posture included in the training video, but its direction and angle of the face, neck, torso, arms, legs, etc. may be outside the trainer's demonstration posture and a predetermined threshold range.

In other words, the artificial intelligence model 131 may be trained to identify the user's posture that does not match the training image using images photographed by a user exercising in an incorrect posture.

Figure 4:
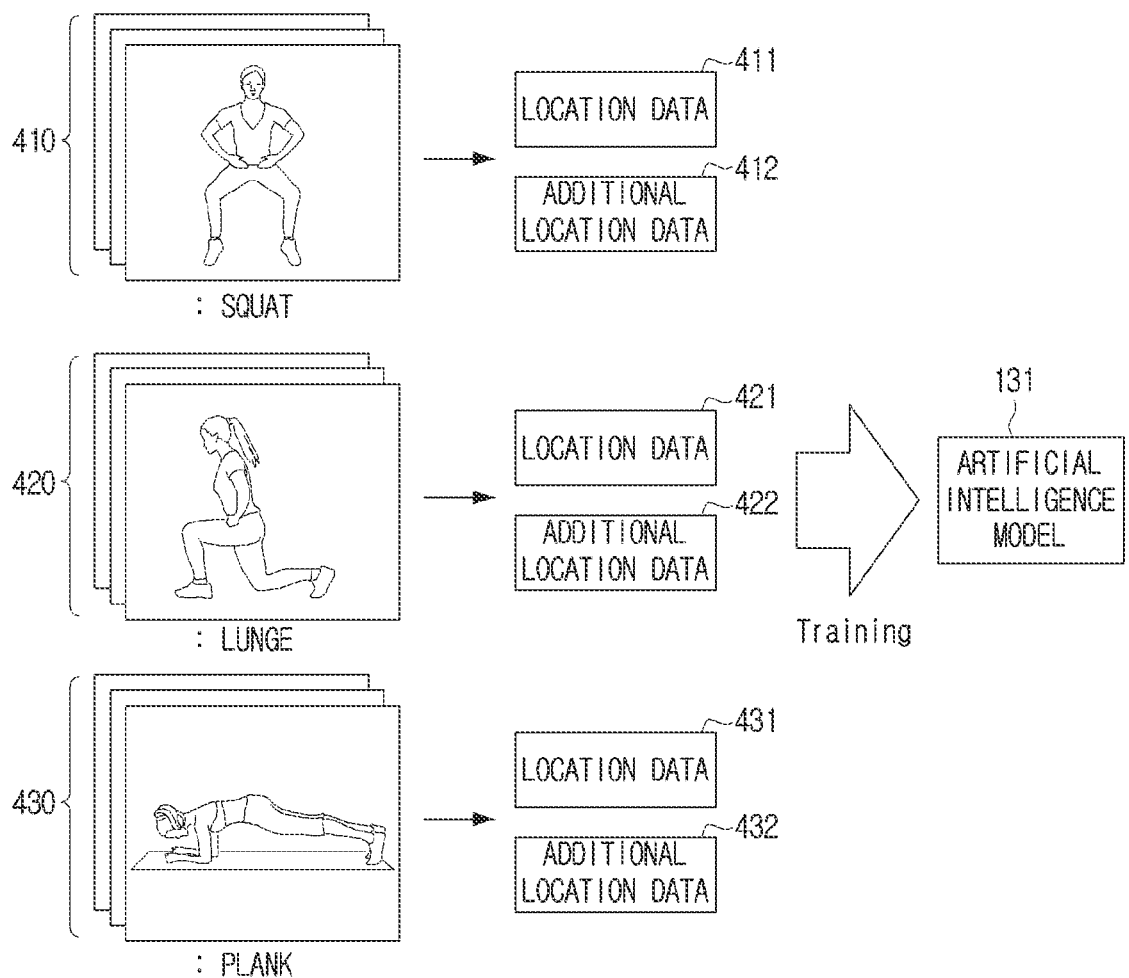

For example, referring to FIG. 4, location data 411 may be acquired from images 410 of the user performing "squat" in an incorrect posture, and additional location data 412 may be acquired based on the location data.

In this case, the artificial intelligence model 131 may be trained using the location data 411 and the additional location data 412 as input data and the "incorrect squat" posture as output data.

Similarly, the artificial intelligence model 131 may be trained using location data 421 acquired from images 420 of the user performing "lunge" in an incorrect posture and additional location data 422 acquired based on the location data 421 as input data, and "incorrect lunge" posture as output data. In addition, the artificial intelligence model 131 may be trained using location data 431 acquired from images 430 of the user performing "plank" in an incorrect posture and additional location data 432 acquired based on the location data 431 as output data.

As such, the artificial intelligence model 131 may be trained for each of a plurality of postures, using the location data acquired from images of the user is in an incorrect posture, and additional location data acquired based on the location data.

Accordingly, the artificial intelligence model 131 may be trained to output an incorrect posture of the user included in the image when location data for the plurality of body parts of the user acquired from an image of the user is input.

According to an embodiment, the artificial intelligence model 131 may be trained to identify a body part that have a negative exercise effect according to the second posture.

In other words, the artificial intelligence model 131 may be trained using not only location data and additional location data, but also information on body parts that have a bad effect according to the user's incorrect posture as input data.

For example, the "inaccurate lunge" posture may strain the user's waist. In this case, the artificial intelligence model 131 may be trained using not only location data and additional location data for "inaccurate lunge", but also information about the waist as input data, and the "squat" posture and "waist" as output data.

Accordingly, when location data for a plurality of body parts of the user acquired from the image of the user is input, the artificial intelligence model 131 may be trained to output information about the incorrect posture of the user included in the image and body parts that have negative exercise effect in the corresponding posture.

As described above, according to an embodiment of the disclosure, since the artificial intelligence model 131 is trained based on location data and additional location data acquired by rotating the location data, even if the user is photographed from various angles, the artificial intelligence model 131 may identify the user's posture included in the corresponding image.

Accordingly, according to an embodiment of the disclosure, even if the user performs an exercise according to a training image at a location convenient for the user according to environmental circumstances, not in front of the display apparatus 100, the user's posture may be accurately identified.

The training of the artificial intelligence model 131 described above may be performed by a server (not shown), and may be stored in the memory 130 when the display apparatus 100 is manufactured, and may be stored in the memory 130 by being downloaded from the server (not shown). Also, such training may be performed by the processor 140.

The processor 140 may include various processing circuitry and be electrically connected to the camera 110, the display 120, and the memory 130 to control overall operations and functions of the display apparatus 100.

The processor 140 may include, for example, and without limitation, a central processing unit (CPU), a dedicated processor, an application processor (AP), or the like, and may execute one or more software programs stored in the memory 130 according to one or more instructions stored in the memory 130.

The processor 140 may control the display 110 to display a training image and an image photographed by the camera 110.

The training image may include a demonstration image of a trainer. In this case, the training image may be stored in the memory 130 or provided to the display apparatus 100 through streaming.

For example, when a user command for executing a training application is input, the processor 140 may execute the training application stored in the memory 130. The training application may be stored in the memory 130 when the display apparatus 100 is manufactured, and be also downloaded with the application from a server (not shown) providing various applications and stored in the memory 130.

The processor 140 may control the display to display the training image on an area of the display 110. The processor 140 may control the camera 110 photograph a front of the display apparatus 100 and display the photographed image on another area of the display 110.

In addition, the processor 140 may identify the user's posture included in the photographed image by inputting location data on a plurality of body parts of the user included in the photographed image into the artificial intelligence model 131, and identify whether the user's posture matches the posture corresponding to the training image.

The location data for the plurality of body parts may include coordinate data for the plurality of body parts, and may include a plurality of key points indicating a plurality of joint parts of the user included in the image.

In order to acquire location data, an artificial intelligence model (not shown) for extracting a point of a human joint from an image may be used. In this case, the artificial intelligence model (not shown) may be stored in the memory 130.

In other words, the processor 140 may input the photographed image into an artificial intelligence model (not shown) to acquire location data for a plurality of body parts of the user included in the photographed image, and input the acquired location data into the artificial intelligence model 131.

However, this is only an example, and the location data may be acquired in various ways.

In addition, the processor 140 may identify a posture corresponding to the training image. In this case, a metadata for the training image may include information on a posture performed by the trainer included in the training image for each time of the training image.

In this case, the processor 140 may determine a posture performed by the trainer in the training image using metadata about the training image.

In addition, the processor 140 may identify the user's posture included in the photographed image. For example, the processor 140 may identify the user's posture included in the photographed image based on a probability output from the artificial intelligence model 131.

In this case, the processor 140 may identify a posture having a probability greater than a predetermined threshold value as the user's posture.

For example, when a probability corresponding to the "squat" posture output from the artificial intelligence model 131 is greater than the predetermined threshold, the processor 140 may identify the user's posture as "squat".

In this case, the processor 140 may identify that the user's posture matches the posture corresponding to the training image.

As another example, when a probability corresponding to the "incorrect lunge" posture output from the artificial intelligence model 131 is greater than the predetermined threshold, the processor 140 may identify that the user's posture has a probability of "incorrect lunge".

In this case, the processor 140 may identify that the user's posture does not match the posture corresponding to the training image.

The processor 140 may control the display 120 to display a training guide based on whether the user's posture matches the posture corresponding to the training image.

For example, if the user's posture is identified as matching the posture corresponding to the training image, the processor 140 may display a training guide including information indicating that the user's posture matches the posture corresponding to the training image.

Figure 5A:
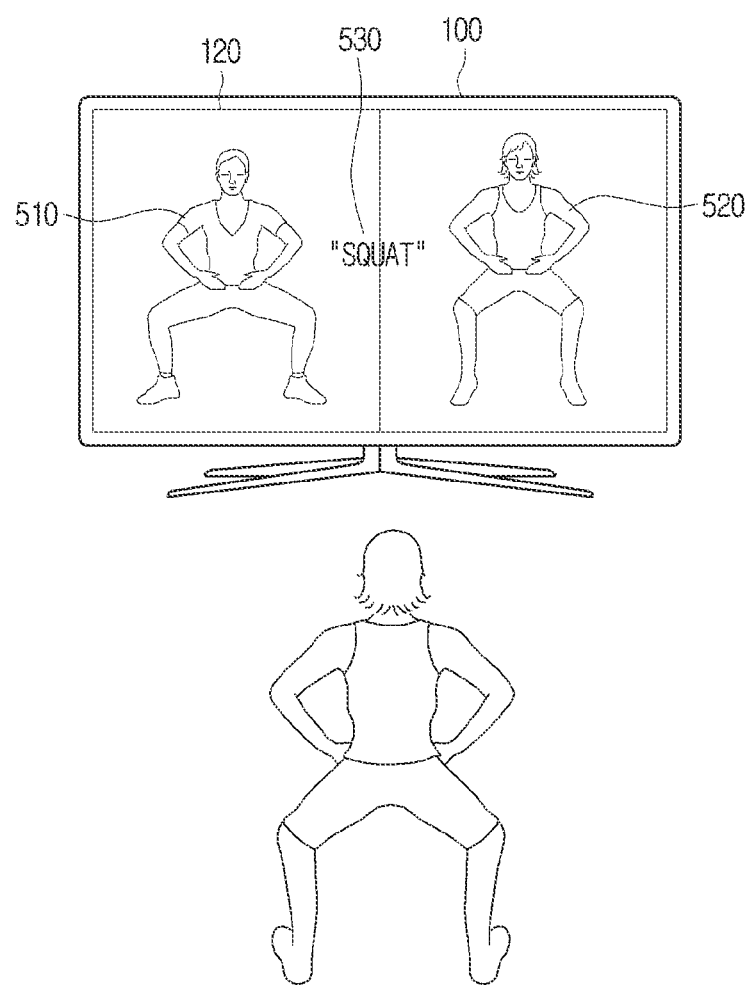
FIGS. 5A and 5B are diagrams illustrating an example method of providing a training guide in a display apparatus according to various embodiments.

For example, as shown in FIG. 5A, the processor 140 may control the display to display a training image 510 in one area of the display 120 and an image 520 of the user in another area of the display 120.

In this case, if the user's posture is identified as matching the posture corresponding to the training image, the processor 140 may display a training guide 530 including text such as "correct squat posture" on the display 120.

According to an embodiment, the processor 140 may control the display to display information on an accuracy indicating a degree to which the user's posture matches the posture corresponding to the training image on the display 120.

In this case, the accuracy may be determined based on a probability that the user's posture corresponds to a specific posture.

Figure 5B:
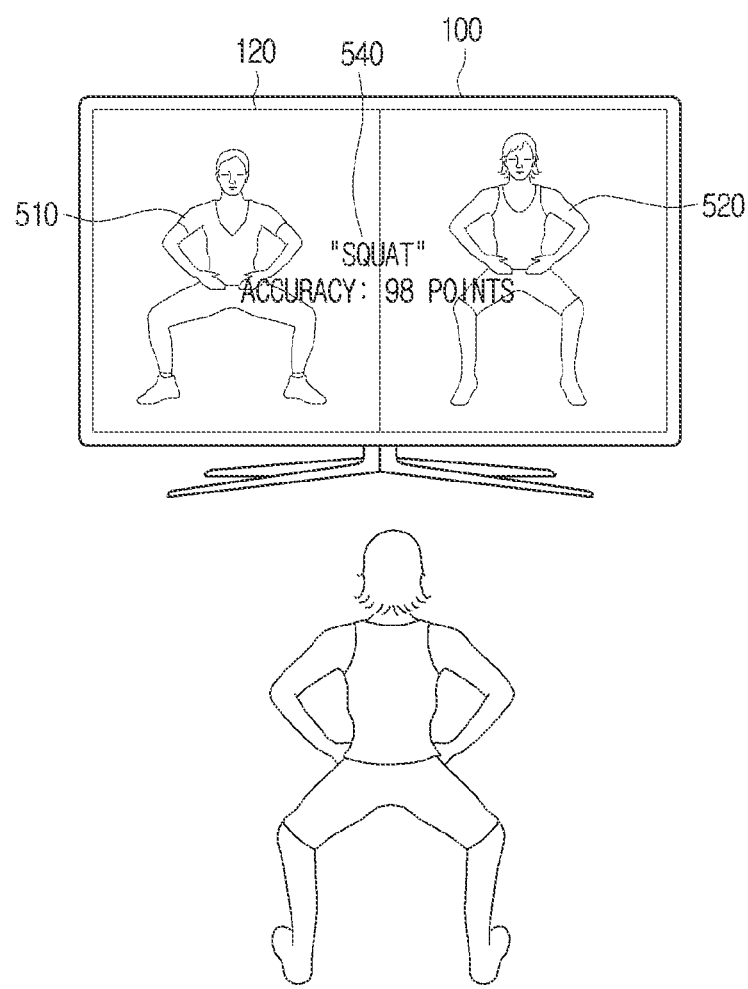

For example, as shown in FIG. 5B, the processor 140 may display on the display 120 a training guide 540 including texts such as "correct squat posture" and "accuracy: 98 points".

When the user's posture is identified as matching the posture corresponding to the training image, the processor 140 may control the display 120 to identify information on a body part that has an exercise effect based on information on the body part output from the artificial intelligence model 131.

In other words, the artificial intelligence model 131 may output information on a body part having an exercise effect on the identified user's posture. In this case, the processor 140 may control the display to display information on the body part where the exercise effect appears based on information output from the artificial intelligence model 131.

For example, if the user's posture is identified as the "squat" posture, the artificial intelligence model 131 may output "good for legs, hips and inner thighs" as information on the body part that have an exercise effect by the "squat" posture.

Figure 6A:
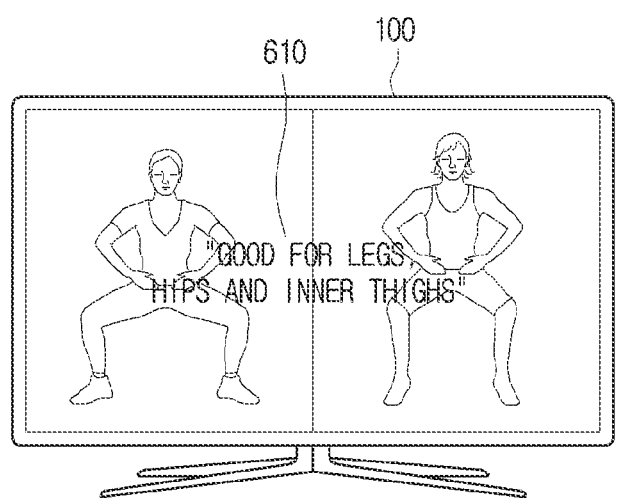
FIGS. 6A and 6B are diagrams illustrating an example method of providing a training guide in a display apparatus according to various embodiments.
Figure 6A:
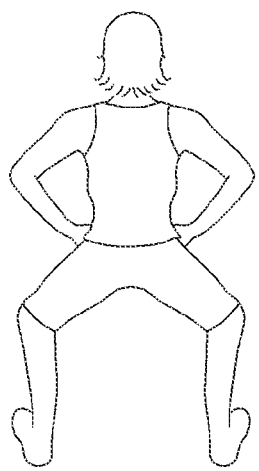

Accordingly, as shown in FIG. 6A, when the user's posture is identified as the "squat" posture, the processor 140 may control the display to display a training guide 610 including text such as "good for legs, hips and inner thighs".

As another example, the processor 140 may highlight a portion effective for exercise and control the display to display it on the display 120.

Figure 6B:
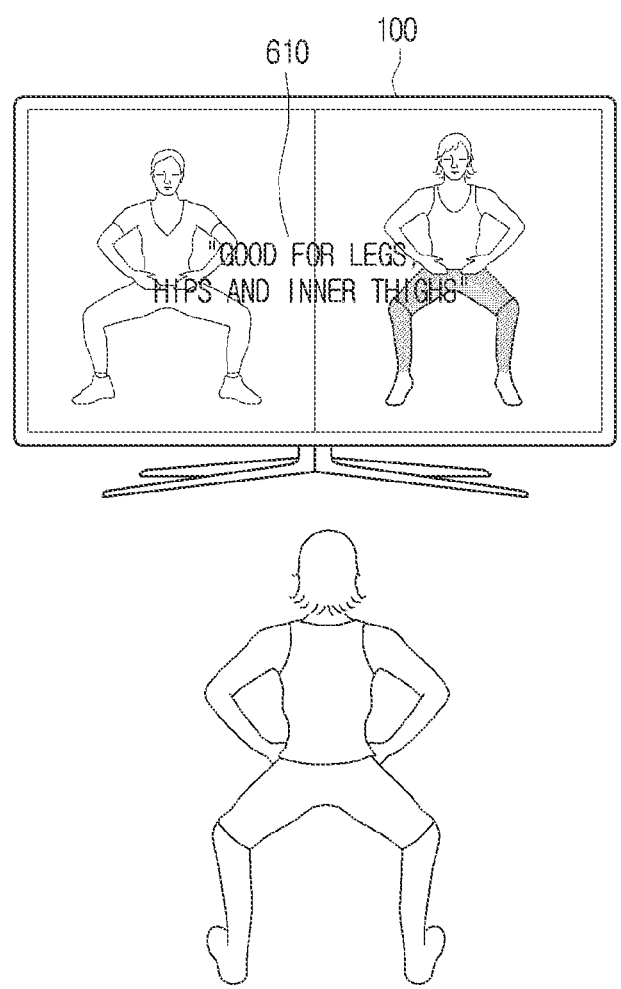

For example, as shown in FIG. 6B, the processor 140 may highlight 620 the user's legs, hips, and inner thighs included in the photographed image to indicate that the corresponding body part that would have an exercise effect.

If the user's posture is identified as not matching the posture corresponding to the training image, the processor 140 may control the display to display a training guide including information indicating that the user's posture does not match the posture corresponding to the training image.

Figure 7:
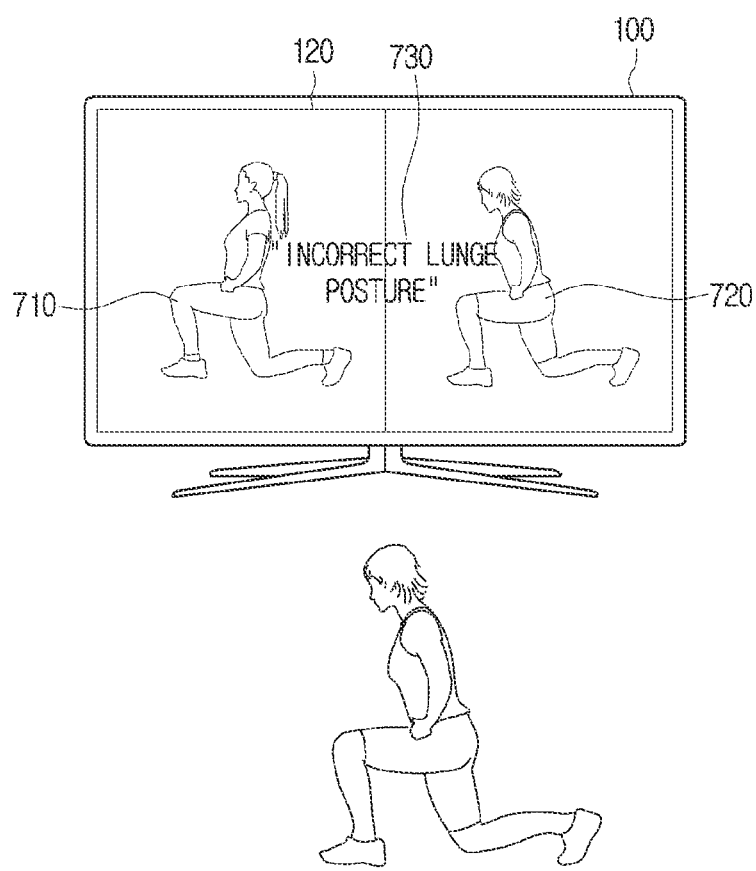
FIG. 7 is a diagram illustrating an example method of providing a training guide in a display apparatus according to various embodiments.

For example, as shown in FIG. 7, the processor 140 may control the display to display a training image 710 in one area of the display 120 and an image 720 of the user in another area of the display 120.

In this case, if the user's posture is identified as not matching the posture corresponding to the training image, the processor 140 may control the display to display a training guide 730 including text such as "Incorrect lunge posture" on the display 120.

If the user's posture is identified as not matching the posture corresponding to the training image, the processor 140 may control the display 120 to display information on a body part that has a negative exercise effect based on the information on the body part output from the artificial intelligence model 131.

In other words, the artificial intelligence model 131 may output information on a body part that has a negative exercise effect for the identified user's incorrect posture. In this case, the processor 140 may display the information on the body part that have a negative exercise effect based on the information output from the artificial intelligence model 131.

For example, if the user's posture is identified as being the "incorrect lunge" posture, the artificial intelligence model 131 may output "waist" as information on the body part that have a negative exercise effect by the "incorrect lunge" posture.

Figure 8A:
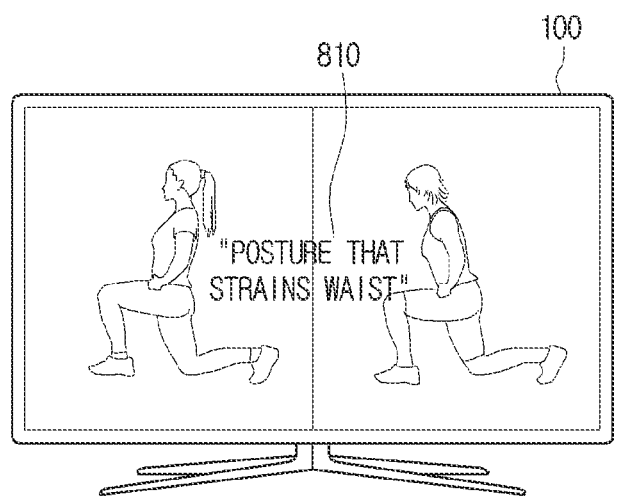
FIGS. 8A and 8B are diagrams illustrating an example method of providing a training guide in a display apparatus according to various embodiments.
Figure 8A:
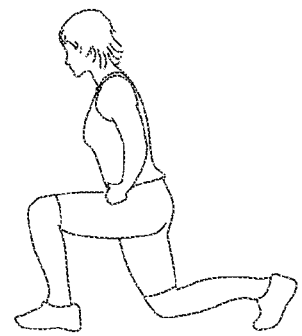

Accordingly, as shown in FIG. 8A, when the user's posture is identified as being the "incorrect lunge" posture, the processor 140 may display a training guide 810 including text such as "posture that strains waist" on the display 120.

As another example, the processor 140 may highlight a part that has a negative effect on exercise on the display 120.

Figure 8B:
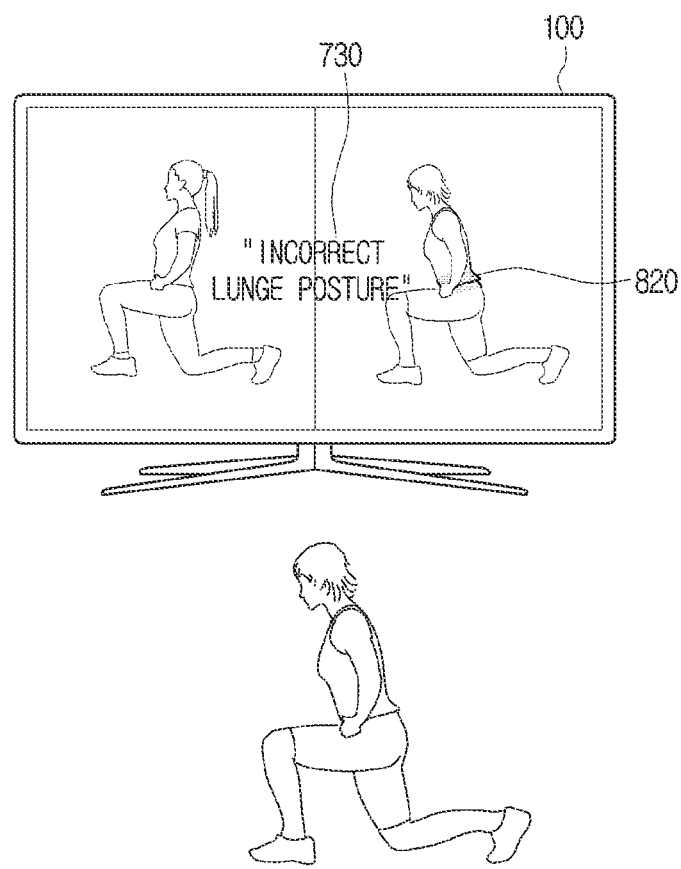

For example, as shown in FIG. 8B, the processor 140 may highlight 820 the user's waist included in the photographed image to show that it is a part that may have a negative effect on the corresponding body part.

As described above, according to various embodiments of the disclosure, the display apparatus 100 may identify the user's posture and provide a training guide according to whether the user's posture matches the trainer's posture included in the training image.

Figure 9:
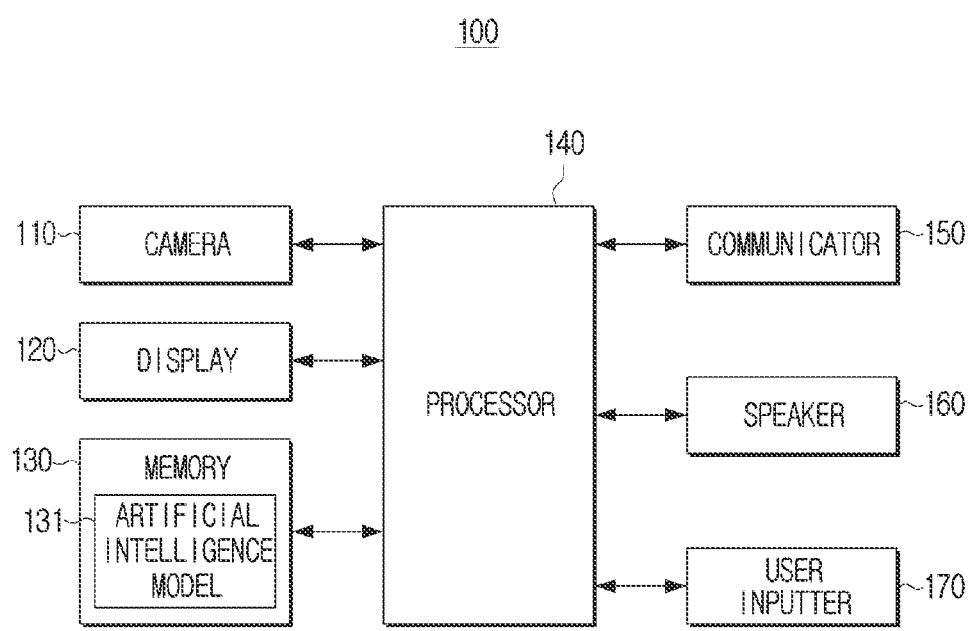
FIG. 9 is a block diagram illustrating an example configuration of a display apparatus according to various embodiments.

FIG. 9 is a block diagram illustrating an example configuration of a display apparatus according to various embodiments.

Referring to FIG. 9, the display apparatus 100 may include a camera 110, a display 120, a memory 130, a processor (e.g., including processing circuitry) 140, a communicator 150 (e.g., including communication circuitry), a speaker 160, and a user inputter (e.g., including input circuitry) 170. The components may be controlled by the processor 140.

The components shown in FIG. 9 are only examples, and at least some components may be omitted or other components may be added according to embodiments.

In addition, since the camera 110, the display 120, the memory 130, and the processor 140 have been described with reference to FIGS. 1 to 8, detailed descriptions of overlapping parts may not be repeated here.

The communicator 150 may include various communication circuitry for performing communication with the external apparatus. For example, the communicator 150 may communicate with a web server (not shown) through a network.

For this operation, the communicator 150 may include various communication circuitry included in various modules for accessing a network, such as a network card.

As another example, the communicator 150 may access a network using a Wi-Fi communication module for performing Wi-Fi communication, and access the network through various mobile communication methods such as 3G, long term evolution (LTE), 5G, or the like.

In this case, the processor 140 may access a server (not shown) that provides various applications through the communicator 150 to download applications. For example, the processor 140 may access a server (not shown) through the communicator 150 to download a training application.

In addition, the processor 140 may access a server (not shown) through the communicator 150 to download the artificial intelligence model 131.

The speaker 160 may output various sounds. For example, the speaker 160 may output audio corresponding to the training image.

The user inputter 170 may include various input circuitry for receiving various user commands. For example, the user inputter 170 may include a touch panel or the like, and may also receive a user command from a remote control for controlling the display apparatus 100.

In this case, the processor 140 may control other components to execute various functions according to a user command.

For example, when a user command for executing a training application is input, the processor 140 may execute a training application stored in the memory 130.

In addition, the processor 140 may display the training image on one area of the display 120 and display the image photographed by the camera 110 on another area of the display 120. In this case, the processor 140 may output audio corresponding to the training image through the speaker 160.

The processor 140 may identify the user's posture included in the image photographed through the camera 110 and provide a training guide according to whether the user's posture matches the posture of the trainer included in the training image.

Figure 10:
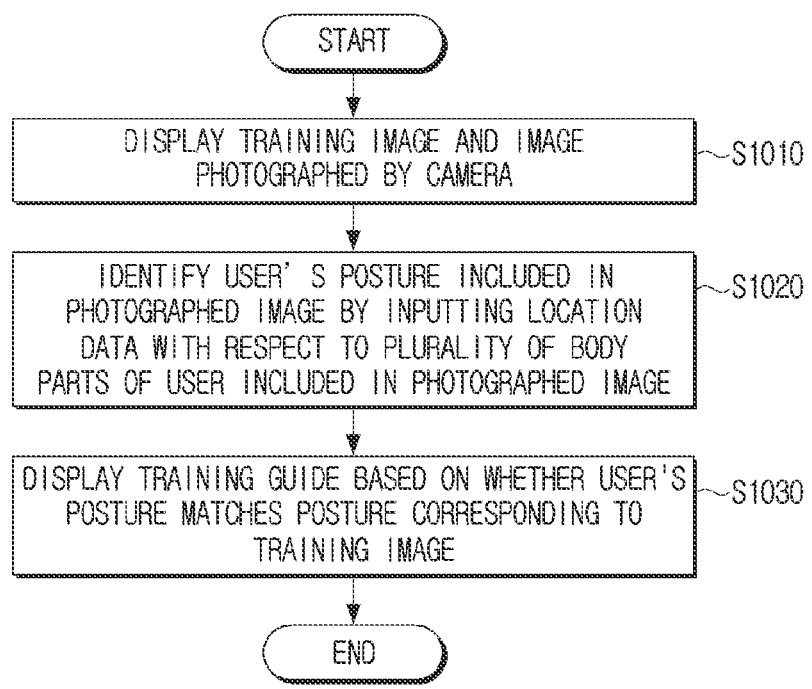
FIG. 10 is a flowchart illustrating an example method of controlling a display apparatus according to various embodiments.

FIG. 10 is a flowchart illustrating an example method of controlling a display apparatus according to various embodiments.

A training image and an image photographed by the camera are displayed (S1010).

Location data on a plurality of body parts of the user included in the photographed image is input into the artificial intelligence model to identify the user's posture included in the photographed image (S1020).

The artificial intelligence model may be a model trained to identify the user's posture based on location data for the plurality of body parts of the user included in the images and additional location data acquired based on the location data. In this case, the additional location data may be acquired by rotating the location data.

A training guide may be displayed based on whether the user's posture matches the posture corresponding to the training image (S1030).

For the operation of S1030, if the user's posture is identified as matching the posture corresponding to the training image, a training guide including information indicating that the user's posture matches the posture corresponding to the training image may be displayed, and if the user's posture is identified as not matching the posture corresponding to the training image, a training guide including information indicating that the posture of the user does not match the posture corresponding to the training image may be displayed.

In addition, the artificial intelligence model may be trained to identify the user's first posture based on location data for a plurality of body parts of the user in the first posture included in the images and additional location data acquired based on the location data.

The first posture may be a posture that matches a posture corresponding to the training image.

In addition, if the artificial intelligence model may be trained to identify the body part that has a negative exercise effect according to the first posture, and for the operation of S1030, if the user's posture is identified as matching the posture corresponding to the training image, information on the body part that has an exercise effect may be displayed.

The artificial intelligence model may be trained to identify the user's second posture based on location data for a plurality of body parts of the user in the second posture included in the images and additional location data acquired based on the location data.

The second posture may be a posture that does not match a posture corresponding to the training image.

In addition, the artificial intelligence model may be trained to identify body parts that have negative exercise effects according to the second posture, and for the operation of S1030, if the user's posture is identified as not matching the posture corresponding to the training image, information on the body part that has a negative exercise effect may be displayed based on the information on the body part output from the artificial intelligence mode.

An example method of identifying the user's posture using the artificial intelligence model and providing guide information accordingly has been described.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include a code made by a compiler or a code executable by an interpreter. The machine-readable storage media may be provided in a form of a non-transitory storage media. The 'non-transitory' storage media does not include a signal and is tangible, and does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A display apparatus comprising:
  a camera;
  a display;
  a memory storing an artificial intelligence model trained to identify a posture of a user based on location data with respect to a plurality of body parts of a user included in images and additional location data acquired based on the location data; and a processor, comprising processing circuitry, configured to:
control the display to display a training image and images photographed by the camera,
identify the posture of the user included in the photographed images by inputting, to the artificial intelligence model, the location data with respect to the plurality of body parts of the user included in the photographed images, and
control the display to display a training guide based on whether the posture of the user matches a posture corresponding to the training image,
wherein the artificial intelligence model is configured to be trained to identify a first posture of the user based on location data with respect to a plurality of body parts of the user in the first posture included in the images and additional location data acquired based on the location data, and
wherein the first posture matches the posture corresponding to the training image,
wherein the artificial intelligence model is configured to be trained to identify a body part that has an exercise effect based on the first posture, and
wherein the processor is configured to, based on the posture of the user matching the posture corresponding to the training image, control the display to display information on the body part that has the exercise effect based on information on a body part output from the artificial intelligence model.

2. The apparatus of claim 1, wherein the additional location data includes data acquired by rotating the location data.

3. The apparatus of claim 1, wherein the processor is configured to:
based on the posture of the user matching the posture corresponding to the training image, control the display to display the training guide including information indicating that the posture of the user matches the posture corresponding to the training image, and
based on the posture of the user not matching the posture corresponding to the training image, control the display to display the training guide including information indicating that the posture of the user does not match the posture corresponding to the training image.

4. A display apparatus comprising:
a camera;
a display;
a memory storing an artificial intelligence model trained to identify a posture of a user based on location data with respect to a plurality of body parts of a user included in images and additional location data acquired based on the location data; and
a processor, comprising processing circuitry, configured to:
control the display to display a training image and images photographed by the camera,
identify the posture of the user included in the photographed images by inputting, to the artificial intelligence model, the location data with respect to the plurality of body parts of the user included in the photographed images, and
control the display to display a training guide based on whether the posture of the user matches a posture corresponding to the training image,
wherein the artificial intelligence model is configured to be trained to identify a second posture of the user based on location data with respect to a plurality of body parts of the user in the second posture included in the images, and additional location data acquired based on the location data, and
wherein the second posture does not match the posture corresponding to the training image,
wherein the artificial intelligence model is configured to be trained to identify a body part that has a negative exercise effect based on the second posture, and
wherein the processor is configured to, based on the posture of the user not matching the posture corresponding to the training image, control the display to display information on a body part that has the negative exercise effect based on information on a body part output from the artificial intelligence model.

5. A method for controlling a display apparatus comprising:
displaying a training image and images photographed by a camera;
identifying a posture of a user included in the photographed images by inputting, to an artificial intelligence model, a location data with respect to a plurality of body parts of a user included in the photographed images; and
displaying a training guide based on whether the posture of the user matches a posture corresponding to the training image,
wherein the artificial intelligence model is configured to be trained to identify the posture of the user based on the location data with respect to the plurality of body parts of the user and additional location data acquired based on the location data,
wherein the artificial intelligence model is configured to be trained to identify a first posture of the user based on location data with respect to a plurality of body parts of the user in the first posture included in the images and additional location data acquired based on the location data, and
wherein the first posture matches the posture corresponding to the training image,
wherein the artificial intelligence model is configured to be trained to identify a body part that has an exercise effect based on the first posture, and
wherein the displaying comprises, based on the posture of the user matching the posture corresponding to the training image, displaying information on the body part that has the exercise effect based on information on a body part output from the artificial intelligence model.

6. The method of claim 5, wherein the additional location data includes data acquired by rotating the location data.

7. The method of claim 5, wherein the displaying comprises, based on the posture of the user matching the posture corresponding to the training image, displaying the training guide including information indicating that the posture of the user matches the posture corresponding to the training image, and
based on the posture of the user not matching the posture corresponding to the training image, displaying the training guide including information indicating that the posture of the user does not match the posture corresponding to the training image.

8. The method of claim 5, wherein the artificial intelligence model is configured to be trained to identify a second posture of the user based on location data with respect to a plurality of body parts of the user in a second posture included in the images and additional location data acquired based on the location data, and wherein the second posture does not match the posture corresponding to the training image.

9. The method of claim 8, wherein the artificial intelligence model is configured to be trained to identify a body part that has a negative exercise effect based on the second posture, and wherein the displaying comprises, based on the posture of the user not matching the posture corresponding to the training image, displaying information on a body part that has the negative exercise effect based on information on a body part output from the artificial intelligence model.

\* \* \* \* \*